United States Patent [19]

Soga et al.

[11] Patent Number: 4,519,931
[45] Date of Patent: May 28, 1985

[54] MAGNETIC FLUID

[75] Inventors: Mamoru Soga, Osaka; Keiichi Yubakami, Neyagawa; Nobuo Sonoda, Settsu; Wataru Shimotsuma, Ibaraki, all of Japan

[73] Assignee: Matsushita Electric Industrial Co., Ltd., Kadoma, Japan

[21] Appl. No.: 402,074

[22] Filed: Jul. 26, 1982

[30] Foreign Application Priority Data

Jul. 29, 1981 [JP] Japan ................... 56-119890

[51] Int. Cl.$^3$ ................ H04B 35/00; C09D 5/23; H01F 1/00
[52] U.S. Cl. ................ 252/62.51; 252/62.52; 428/402; 428/611
[58] Field of Search ............... 428/402, 611; 252/62.51, 62.53, 62.56, 62.55, 62.52

[56] References Cited

U.S. PATENT DOCUMENTS

| | | | |
|---|---|---|---|
| 4,020,236 | 4/1977 | Aonuma et al. | 428/457 |
| 4,116,906 | 9/1978 | Ishino et al. | 523/137 |
| 4,125,667 | 11/1978 | Jones | 428/403 |
| 4,145,300 | 3/1979 | Hendriks | 252/62.1 |
| 4,285,801 | 8/1981 | Chiang | 204/299 R |
| 4,296,176 | 10/1981 | Lennon et al. | 428/407 |

Primary Examiner—Arthur P. Demers
Attorney, Agent, or Firm—Stevens, Davis, Miller & Mosher

[57] ABSTRACT

This invention provides a magnetic fluid which is diversified in hue and stable in the electric fields.

The magnetic fluid of this invention is composed of a dispersion of ferromagnetic particles dispersed by a surfactant, and a colorant having the same charge as the dispersing medium in said dispersing medium.

The dyes effective for use in this invention are the nonionic azo dyes, anthrquinone dyes and metal-containing dyes, and the pigments useful in this invention are the organic or inorganic pigments treated so as to have an isoelectric point in the dispersing medium. A magnetic fluid having black color or other desired hues can be obtained by properly selecting the dye and/or pigment.

The magnetic fluid of this invention exhibits its excellent properties particularly when used as a recording material.

14 Claims, 3 Drawing Figures

MAGNETIC FLUID

BACKGROUND OF THE INVENTION

This invention relates to an improvement in magnetic fluid, and more definitely it relates to an improvement on hue and electrical properties of magnetic fluid.

Usually, magnetic fluid is a liquid in which fine magnetic particles, such as fine magnetite particles having a particle size of 50-200 Å, are suspended in a dispersing medium by the aid of a surfactant. It has a dark brown color and keeps stable for a long time to stay substantially free from sedimentation of flocculation. As a dispersing medium for such magnetic fluid, there is available paraffin oil, ester oil, silicone oil, water and the like, and as a surfactant, there may be used carboxylic acids such as oleic acid, linoleic acid, etc., as well as cationic surfactants and nonionic surfactants.

Magnetic fluid finds a wide variety of uses in many fields of industry, including use as a sealing agent, lubricant, sink-float separation medium, oil-water separating agent, recording material and so on.

The magnetic fluid of this invention is usable in these fields of commercial products, and in particular it exhibits excellent properties in application to the field of recording material.

As image recording techniques utilizing a magnetic fluid, there are known the ink jet method and the magnetofluidographic use (hereinafter referred to as MFG method) disclosed in Japanese Patent Kokai (Laid-Open) No. 23534/79. The present invention is intended to provide a magnetic fluid which is particularly useful for the MFG method in which the magnetic fluid is let fly under the action of an electric or magnetic force to thereby form an image.

As magnetic fluid used for MFG method, there are available those magnetic fluids which use paraffin, ester, ether or the like as a base oil with their concentration being suitably adjusted, or those further including a colorant such as dye or pigment. Magnetic fluid containing no colorant forms an image having a light brown or dark brown color hue corresponding to the magnetic particles in the fluid, and the image quality is degraded due to such brown color hue. For changing the hue of the magnetic fluid from light brown or dark brown to black, it is conceivable to disperse a dye or a pigment in the magnetic fluid, but what comes into question here is separation of the colorant and magnetic particles and possible decomposition, aggregation and/or segregation of the colorant particles in the recording section of the apparatus. In the MFG method, in order to let the ink fly, a meniscus of the magnetic fluid is formed on a fine stylus (about 60 μm in diameter) by a magnetic force, and a pulse voltage of several hundred volts is given to the stylus in correspondence to the image signal. Thus, the magnetic fluid is placed in an intense electric field (several thousand V/mm). Therefore, in use of the magnetic fluid as a magnetic ink for recording, if no consideration is given to the electrical properties of the dye or pigment added as colorant, there may arise a situation where the colorant particles get caught on the stylus or undergo aggregation or segregation with the result that the obtained image presents a color different from that of the original ink or assumes the very color of the magnetic particles carrying no colorant, resulting in a poor image quality.

SUMMARY OF THE INVENTION

The object of this invention is to provide a magnetic fluid diversified in hue and stable when placed in an electric field. The magnetic fluid according to this invention is particularly useful as a recording material for image recording performed by ejecting the magnetic fluid under the action of an electric or magnetic force.

The magnetic fluid of this invention is composed of a dispersion of ferromagnetic particles dispersed by a surfactant and a colorant having the same charge as the dispersing medium in said dispersing medium.

Figure 1:
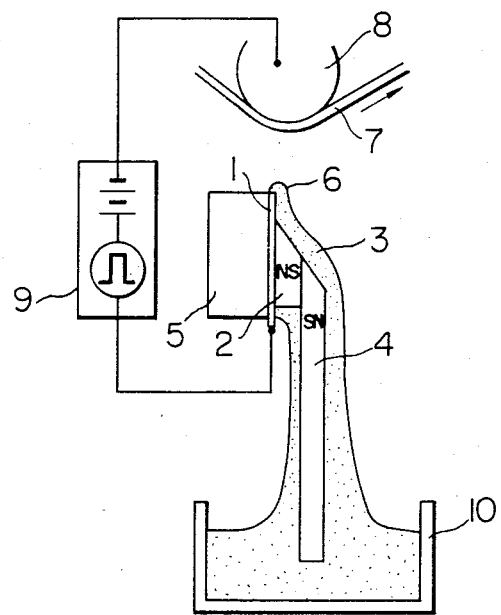
FIG. 1 and FIG. 2 are a side view and a frontal view, respectively, showing schematically the construction of a magnetic fluid recording device.

The following nomenclature is used in the drawings to designate the respective component parts: 1: multistylus, 2: magnet for protrusion, 3: magnetic fluid, 4: magnet for feed, 5: base pedestal, 6: protruded part, 7: recording medium, 8: controlling electrode, 10: magnetic fluid tank, 11,11': electrodes, 12: glass base.

DETAILED DESCRIPTION OF THE INVENTION

The magnetic fluid according to this invention is composed of a dispersion of ferromagnetic particles dispersed by the aid of a surfactant and a colorant stable in the electric field.

Used as colorant in this invention is a dye which does not undergo electrophoresis, electrolysis, aggregation or segregation in the electric field (of the intensity of around 1,000 V/mm) or a pigment which has no ξ-potential in the dispersing medium. When the magnetic fluid blended with such colorant is used for recording on a fine quality paper according to the MFG method, there is obtained a clear and vivid image with the same color as the ink.

Figure 3:
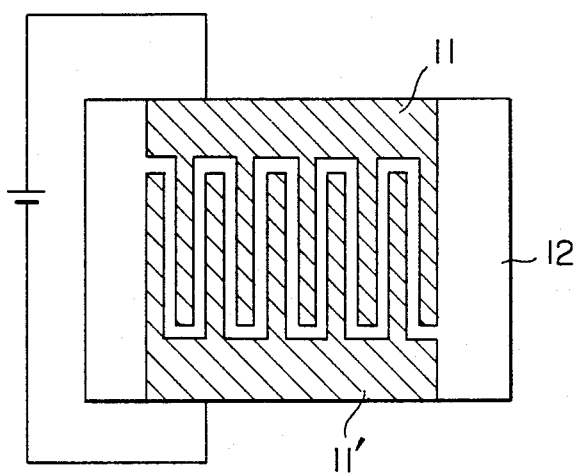
FIG. 3 is a plan view of a device for examining the properties of pigment or dye.

A device such as illustrated in FIG. 3 can be conveniently used as a simple way for confirming that the dye or pigment used in the magnetic fluid of this invention does not undergo electrophoresis, electrolysis, aggregation or segregation in the electric field. The device comprises a pair of comb-shaped electrodes 11, 11' made from $SnO_2$ disposed on a glass base 12. During use of the device, a DC electric field of 1 KV/mm is applied across both electrodes and about 0.1 cc of a dye or pigment dispersion is dropped to the opposing parts of both electrodes and observed by an optical microscope (100 magnifications). It is easy to judge whether the dye or pigment used is stable or not in the electric field because if such dye or pigment is unstable in the electric field, the particles of such dye or pigment are segregated on one of the electrodes or aggregated on or between the electrodes.

As a result of examinations of various kinds of dyes, it was found that the dyes having no ion in the molecule can stay substantially stable in the electric field. As typical examples of such dyes, the following may be cited: anthraquinone dyes such as 1,4-diaminoanthraquinone (C.I. 61,100) or such 1,4-diaminoanthraquinone which has its amino group substituted with n-octylamino group or n-dodecylamino group; azo dyes such as Solvent Black 3 (C.I. 26,150) and the derivatives having an n-octyl group incorporated at the para position of phenyl group; and metal-containing dyes such as C.I. Direct Blue 76 (C.I. 24,411), C.I. Direct Blue 98 (C.I. 23,155), etc.

In the case of pigments, if a pigment has ξ-potential in the dispersion, the pigment particles in the dispersion placed in an electric field are attracted to the electrode of the polarity opposite to the charge on said pigment particles. Therefore, if no aggregation or segregation of the pigment particles occurs on or between the two electrodes when an electric field is applied across said both electrodes, then such pigment particles may be deemed as having no ξ potential.

In this invention, therefore, it is possible to use any type of pigment as long as it does not undergo aggregation or segregation in the electric field with an intensity of about 1 KV/mm. Even those pigments which are liable to undergo aggregation or segregation may be used in the magnetic fluid of this invention if such pigments are properly treated with a charge regulator or other suitable agent to inhibit occurence of aggregation or segragation.

As examples of the organic pigments usable in this invention, there may be cited C.I. Vat Blue 20 (C.I. 59,800), C.I. Acid Blue 45 (C.I. 63,010), C.I. Vat Blue 4 (C.I. 69,800) and the like, and as examples of the inorganic pigments, there may be cited ultramarine blue, Prussian blue, cobalt blue and the like.

Figure 2:
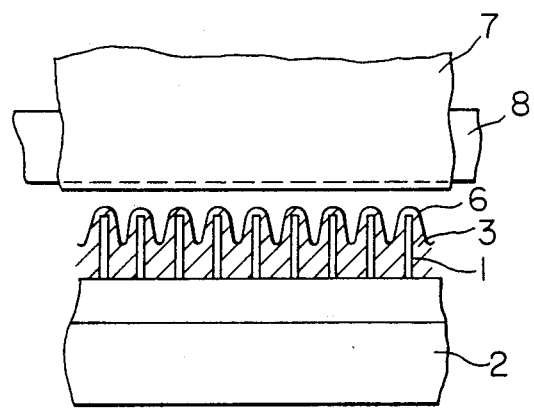

The present invention is described in further detail hereinbelow by way of the embodiment thereof. In the embodiments described below, image recording by use of the magnetic fluid of this invention was carried out according to the MFG method. The outline of the MFG method is diagrammatically illustrated in FIGS. 1 and 2 of the accompanying drawings. A multistylus assembly 1 is mounted on a base pedestal 5, and a magnet for protrusion 2 is bonded to said multistylus assembly 1 for magnetizing the latter. Secured to said magnet 2 is a magnet for feed 4 whereby the magnetic fluid is sucked up from a magnetic fluid tank 10 and supplied to said magnet 2 and multistylus assembly 1, forming the protruded part 6 of magnetic fluid 3, such as shown in FIG. 2, on the respective styli of the multistylus assembly 1. When a voltage is applied across said multistylus assembly 1 and a controlling electrode 8 by a voltage applicator 9, a coulombic force is exercised upon the tip of each protruded part 6 to let the magnetic fluid 3 fly toward a recording medium 7 to form an image thereon.

EXAMPLE 1

| | |
|---|---|
| Magnetic fluid (paraffin-based Mn—Zn ferrite dispersion, mfd. by Matsumoto Yushi Seiyaku Co.) | 80 parts |
| Paraffin (C$_{13}$-C$_{16}$ hydrocarbon) | 30 parts |
| Anthraquinone dye (Blud #8, Morton Chemical Co.) | 10 parts |

The magnetic fluid of the above composition caused no aggregation nor segregation of the dye particles in an electric field of 1 KV/mm. When recording was performed by using this magnetic fluid on a fine quality paper according to the MFG method, there was obtained a clear blue black image same in color as the magnetic fluid.

Employment of an Mn-Zn ferrite dispersion as magnetic fluid in this embodiment of the invention is for the reason that generally in the MFG method, the higher the degree of magnetization in a low magnetic field (about 100 Oe), the better facilitated the feed of the magnetic fluid, resulting in a better recording performance. The magnetic fluid used in the MFG method is required to be magnetized to at least 45 G/100 Oe and to have a viscosity of not greater than 10 cp at 20±15° C. The magnetic fluid of the above-said composition meets these requirements as this fluid is magnetized to approximately 60 G/100 Oe and has a viscosity of 6 cp at 20° C.

EXAMPLE 2

| | |
|---|---|
| Magnetic fluid (paraffin-based Mn—Zn ferrite dispersion, mfg. by Matsumoto Yushi Seiyaku) | 80 parts |
| Paraffin (C$_{13}$-C$_{16}$ hydrocarbon) | 30 parts |
| Azo dye (Blud-Black, Morton Chemical) | 10 parts |

EXAMPLE 3

| | |
|---|---|
| Magnetic fluid (paraffin-based Mn—Zn ferrite dispersion, Matumoto Yushi Seiyaku) | 80 parts |
| Paraffin (C$_{13}$-C$_{16}$ hydrocarbon) | 30 parts |
| Metal-containing (copper) dye (Black 104, Morton Chemical) | 10 parts |

Each of the magnetic fluids of the compositions of Examples 2 and 3 was stable in the electric field of 1 KV/mm and remained free of aggregation and segregation of the dye particles. Also, both of these magnetic fluids showed a magnetization degree of 65 G at 100 Oe and had a viscosity of 5.8 cp at 20° C. MFG recording by use of these magnetic fluids on a fine quality paper gave a clear dark purple image same in color as the magnetic fluid in each case.

In the foregoing Examples 1 to 3, there were used the dyes which are stable in the electric field. In case of using other dye types, for example a triphenylmethane type blue dye, since such dye has both positive and negative charges in the molecule, the triphenylmethane skeleton is turned into carbonium ions and attracted to the negative electrode to undergo aggregation and/or segregation on the electrode. Thus, when MFG recording was carried out by using such dye, the dye particles were aggregated and segregated on the styli or the magnetic field densification preventing electrode and the obtained image was of a color different from that of the magnetic fluid and has color shading.

EXAMPLE 4

| | |
|---|---|
| Magnetic fluid (paraffin-based Mn—Zn ferrite dispersion, mfd. by Matsumoto Yushi Seiyaku) | 80 parts |
| Charge regulator | 1 part |
| Paraffin (C$_{13}$-C$_{16}$ hydrocarbon) | 30 parts |
| Organic pigment (Reflex Blue A5M-G, mfd. by Hoechst AG.) | 10 parts |

The solution prepared by dispersing the above-said pigment with a charge regulator in said paraffin for a period of 30 minutes by using a supersonic washer exhibited no aggregation nor segragation in the electric field of 1 KV/mm.

The magnetic fluid of the above composition showed magnetization of 60 G (at 100 Oe) and a viscosity of 6 cp (at 20° C.), and when recording was conducted by using this fluid on a fine quality paper according to the MFG method, there was obtained a clear dark purple image same in color as the magnetic fluid.

As described above, it is possible with this invention to obtain a magnetic fluid which is capable of stabilized high-quality recording and which is suited for recording of the type in which the magnetic fluid is let fly by making use of an electric or magnetic force to thereby form an image, particularly MFG recording.

While the present invention has been described by way of the embodiments thereof concerning the paraffin-based and Mn-Zn type magnetic fluids, it is also possible according to this invention to obtain a magnetic fluid suited for MFG recording by using other types of magnetic fluids such as ether type or ester type or by using magnetite or other magnetic substances.

What is claimed:

1. A magnetic fluid suitable for use in image recording under the action of magnetic or electric force, comprising fine ferromagnetic particles dispersed in a liquid dispersing medium with the aid of a surfactant, and a suitable colorant dispersed or dissolved in said liquid dispersing medium, having the same charge as the liquid dispersing medium, said fluid being substantially free from colorant aggregation or separation in an electric field of 1 KV/mm.

2. The magnetic fluid according to claim 1, wherein said colorant contains at least one of the azo, anthraquinone and metal-containing dyes soluble in the liquid dispersing medium.

3. The magnetic fluid according to claim 1, wherein said colorant contains at least one of the organic or inorganic pigments which can be dispersed in said liquid dispersing medium.

4. The magnetic fluid according to any one of claims 1 to 3, wherein said dispersing medium contains at least one of liquid paraffin, liquid ether and liquid ester.

5. The magnetic fluid according to any one of claims 1 to 3, wherein the fine ferromagnetic particles contain at least one of cobalt, nickel, iron and ferrite.

6. The magnetic fluid according to claim 5, wherein said ferromagnetic particles are composed of Mn-Zn ferrite.

7. The magnetic fluid according to claim 1, wherein said fine ferromagnetic particles have a particle size of about 50 to 200 angstroms.

8. A magnetic fluid suitable for use in image recording under the action of magnetic or electric force, consisting essentially of fine ferromagnetic particles dispersed in a liquid dispersing medium with the aid of a surfactant, and a suitable colorant dispersed or dissolved in said liquid dispersing medium, having the same charge as the liquid dispersing medium, said fluid being substantially free from colorant aggregation or separation in an electric field of 1 KV/mm.

9. The magnetic fluid according to claim 8, wherein said colorant is at least one of azo, anthraquinone and metal-containing dyes soluble in said liquid dispersing medium.

10. The magnetic fluid according to claim 8, wherein said colorant is at least one of organic and inorganic pigments which can be dispersed in said liquid dispersing medium.

11. The magnetic fluid according to claim 8, wherein said fine ferromagnetic particles have a particle size of about 50 to 200 angstroms.

12. The magnetic fluid according to claim 8, wherein said ferromagnetic particles are composed of Mn-Zn ferrite.

13. The magnetic fluid of claim 9, wherein said dye is selected from the group consisting of 1,4-diaminoanthraquinone, 1,4-diaminoanthraquinone whose amino is substituted with an n-octylamino or n-dodecylamino group, Solvent Black 3 (C.I. 26,150), C.I. Direct Blue 76 (C.I. 24,411) and C.I. Direct Blue 98 (C.I. 23,155).

14. The magnetic fluid of claim 10, wherein said pigment is selected from the group consisting of C.I. Vat Blue 20 (C.I. 59,800), C.I. Acid Blue 45 (C.I. 63,010), C.I. Vat Blue 4 (C.I. 69,800), ultramarine blue, Prussian blue and cobalt blue.

* * * * *